US010646835B2

(12) United States Patent
Jinno et al.

(10) Patent No.: US 10,646,835 B2
(45) Date of Patent: May 12, 2020

(54) MICROBUBBLE GENERATING DEVICE

(71) Applicant: OHNO DEVELOPMENT CO., LTD., Matsuyama-shi, Ehime (JP)

(72) Inventors: Hiroshi Jinno, Niihama (JP); Taro Jinno, Niihama (JP)

(73) Assignee: OHNO DEVELOPMENT CO., LTD., Matsuyama-shi, Ehime (JP)

( * ) Notice: Subject to any disclaimer, the term of this patent is extended or adjusted under 35 U.S.C. 154(b) by 65 days.

(21) Appl. No.: 15/527,889

(22) PCT Filed: Nov. 11, 2015

(86) PCT No.: PCT/JP2015/081684
§ 371 (c)(1),
(2) Date: May 18, 2017

(87) PCT Pub. No.: WO2016/080254
PCT Pub. Date: May 26, 2016

(65) Prior Publication Data

US 2018/0326374 A1 Nov. 15, 2018

(30) Foreign Application Priority Data

Nov. 19, 2014 (JP) ................................ 2014-234330

(51) Int. Cl.
*B01F 5/10* (2006.01)
*B01F 5/00* (2006.01)
(Continued)

(52) U.S. Cl.
CPC ............ *B01F 5/106* (2013.01); *B01F 3/0451* (2013.01); *B01F 3/04978* (2013.01);
(Continued)

(58) Field of Classification Search
CPC .... B01F 7/00916; B01F 5/106; B01F 5/0065; B01F 3/04978; B01F 7/08; B01F 5/0068;
(Continued)

(56) References Cited

U.S. PATENT DOCUMENTS

2017/0252714 A1* 9/2017 Bennett .................. A01G 25/06

FOREIGN PATENT DOCUMENTS

EP 2436496 A1 * 4/2012 ......... C04B 40/0028
EP 2484229 A1 * 8/2012 ............ B01F 5/0065
(Continued)

OTHER PUBLICATIONS

Google translation of WO-0197958-A1 (Year: 2001).*
(Continued)

*Primary Examiner* — Stephen Hobson
(74) *Attorney, Agent, or Firm* — Renner, Otto, Boisselle & Sklar, LLP

(57) ABSTRACT

Provided is a microbubble generating device with a simple structure that can stably and continuously discharge microbubbles in larger volumes from a discharge section. The microbubble generating device is provided with: a liquid introduction section 2 for introducing a liquid L1 within a tank T; a gas introduction section 3*a* for introducing a gas; a pressure feed section 4 for pressure feeding a liquid fluid L2 fed via the liquid introduction section 2 and the gas fed via the gas introduction section 3*a*; a microbubble generating section 5 for generating microbubbles B in the liquid fluid L2 pressure fed by the pressure feed section 4 and discharging the liquid fluid to the liquid L1; and a discharge flow rate adjustment section 55 for adjusting the discharge volume of the liquid fluid L2.

13 Claims, 12 Drawing Sheets

(51) Int. Cl.
*B01F 11/02* (2006.01)
*B01F 3/04* (2006.01)
*B01F 7/08* (2006.01)
*B01F 7/00* (2006.01)

(52) U.S. Cl.
CPC .......... *B01F 5/0065* (2013.01); *B01F 5/0068* (2013.01); *B01F 7/00916* (2013.01); *B01F 7/08* (2013.01); *B01F 11/0208* (2013.01); *B01F 2003/04858* (2013.01); *B01F 2005/0017* (2013.01)

(58) Field of Classification Search
CPC ................ B01F 11/0208; B01F 3/0451; B01F 2003/04858; B01F 2005/0017; B01F 3/04446; B01F 5/00; B01F 15/0203; B01F 15/0266
See application file for complete search history.

(56) References Cited

FOREIGN PATENT DOCUMENTS

| | | | | | |
|---|---|---|---|---|---|
| JP | 09-000900 | A | | 1/1997 | |
| JP | 2006-015312 | A | | 1/2006 | |
| JP | 2006-116365 | A | | 5/2006 | |
| JP | 2009-247950 | A | | 10/2009 | |
| JP | 2010-046660 | A | | 3/2010 | |
| WO | WO 01/97958 | A1 | | 12/2001 | |
| WO | WO-0197958 | A1 | * | 12/2001 | ................ C02F 3/20 |
| WO | WO-2008119199 | A1 | * | 10/2008 | ............ B01F 5/0415 |
| WO | WO-2017151992 | A2 | * | 9/2017 | ............ E02B 11/005 |

OTHER PUBLICATIONS

Communication pursuant to Rule 164(1) for corresponding European Application No. 15861770.4 dated Jul. 3, 2018.
Office Action for corresponding Indonesian Application No. P00201703838 dated Mar. 18, 2019 and English list of references identified therein.
International Search Report for corresponding International Application No. PCT/JP2015/081684 dated Feb. 2, 2016.
Written Opinion for corresponding Singaporean Application No. 11201703983X dated Jan. 25, 2019.
Invitation to Respond to Written Opinion for corresponding Singaporean Application No. 11201703983X dated Jan. 31, 2019.
Written Opinion for corresponding Singapore Application No. 11201703983X dated Mar. 26, 2018.
First Examination Report for corresponding Indian Patent Application No. 201717017460 dated Nov. 18, 2019.
Communication pursuant to EPC 94(3) issued in corresponding European Patent Application No. 15861770.4 dated Oct. 30, 2019.

* cited by examiner

[Fig. 1]
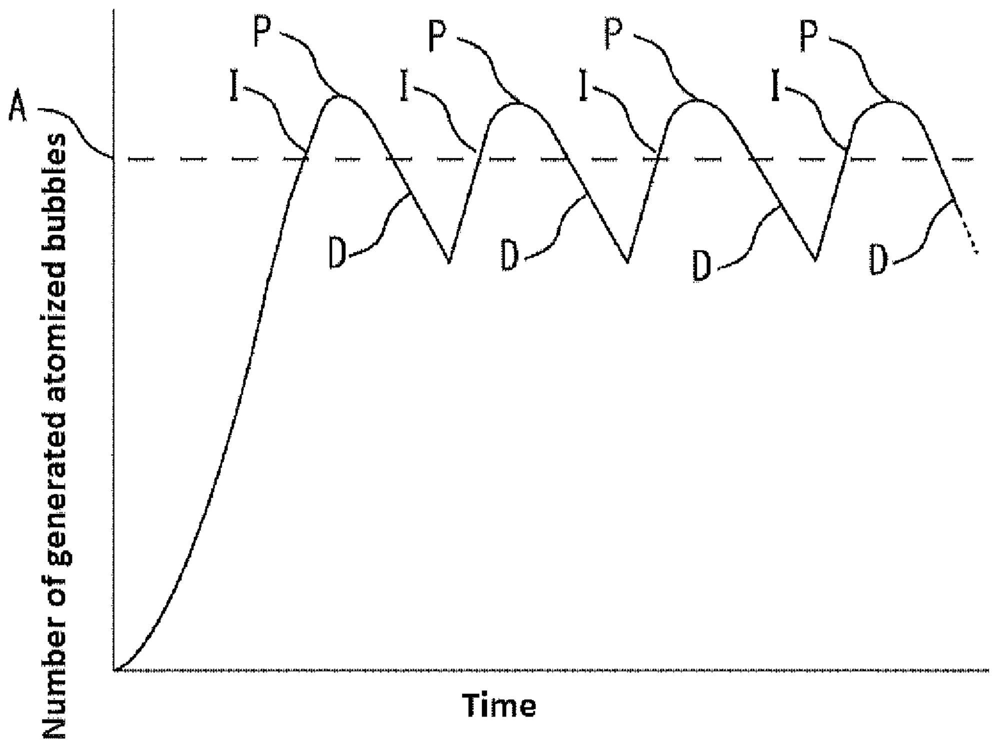
[Fig. 2]
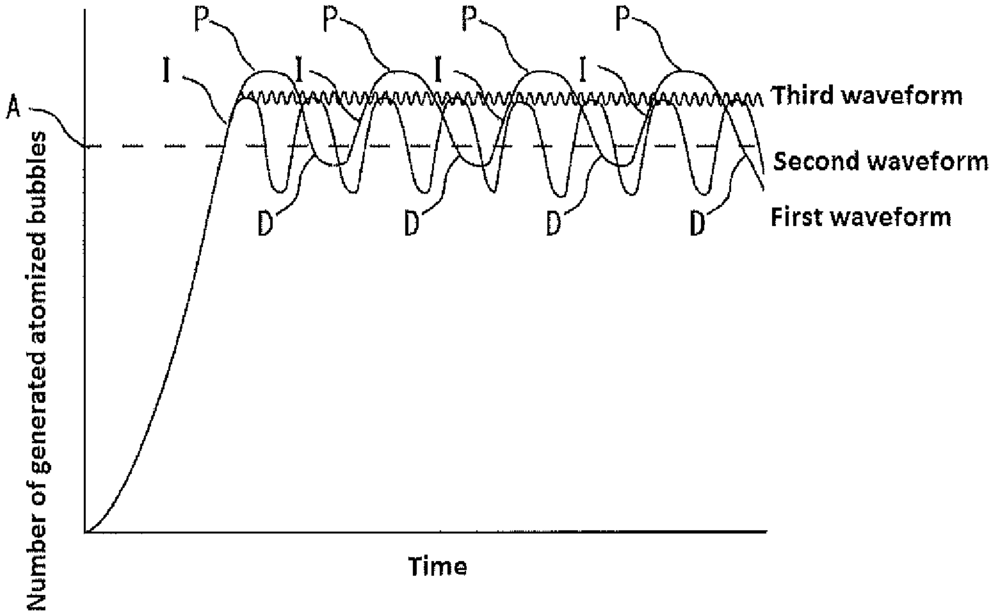

[Fig. 3]
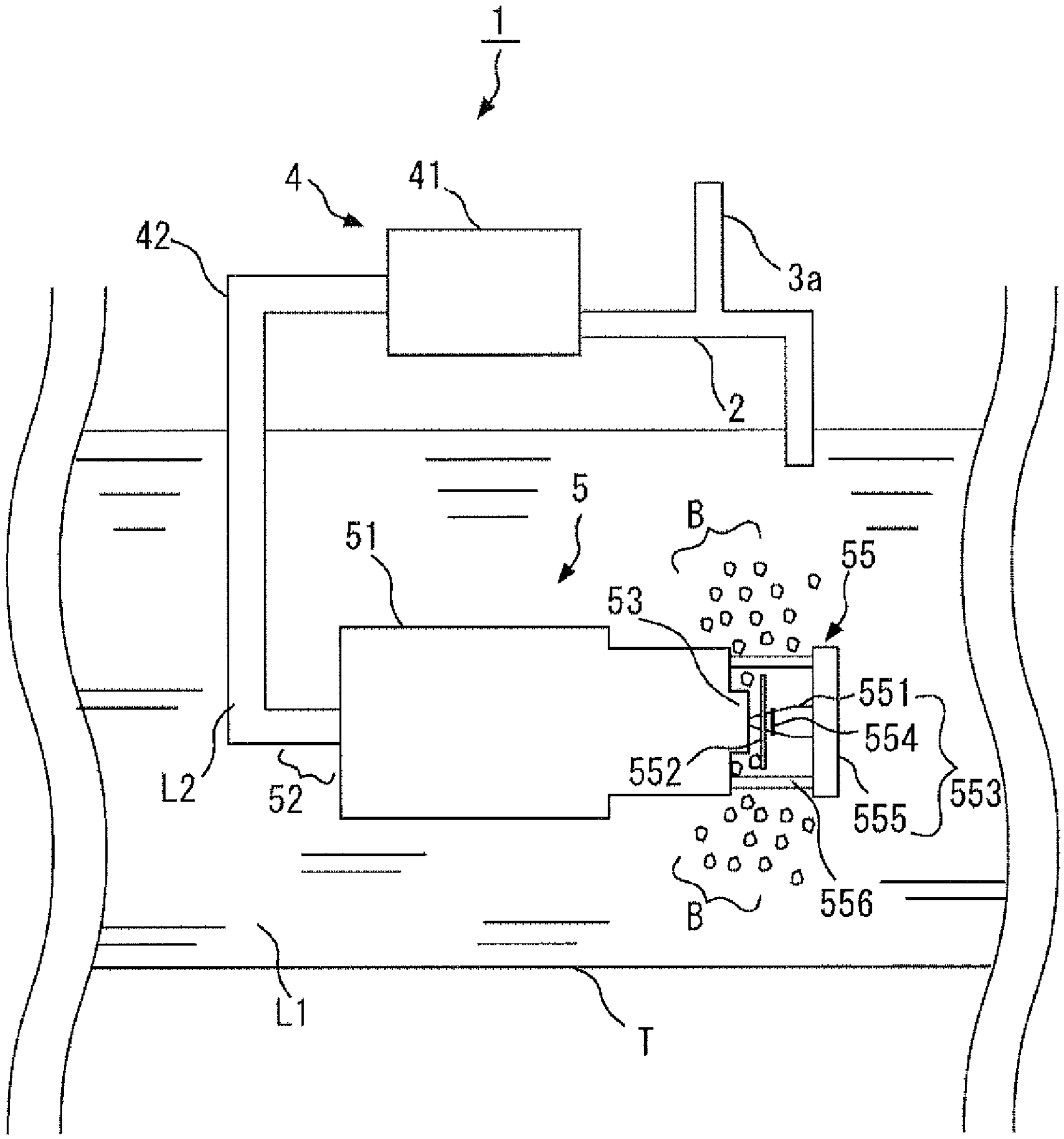

[Fig. 4]
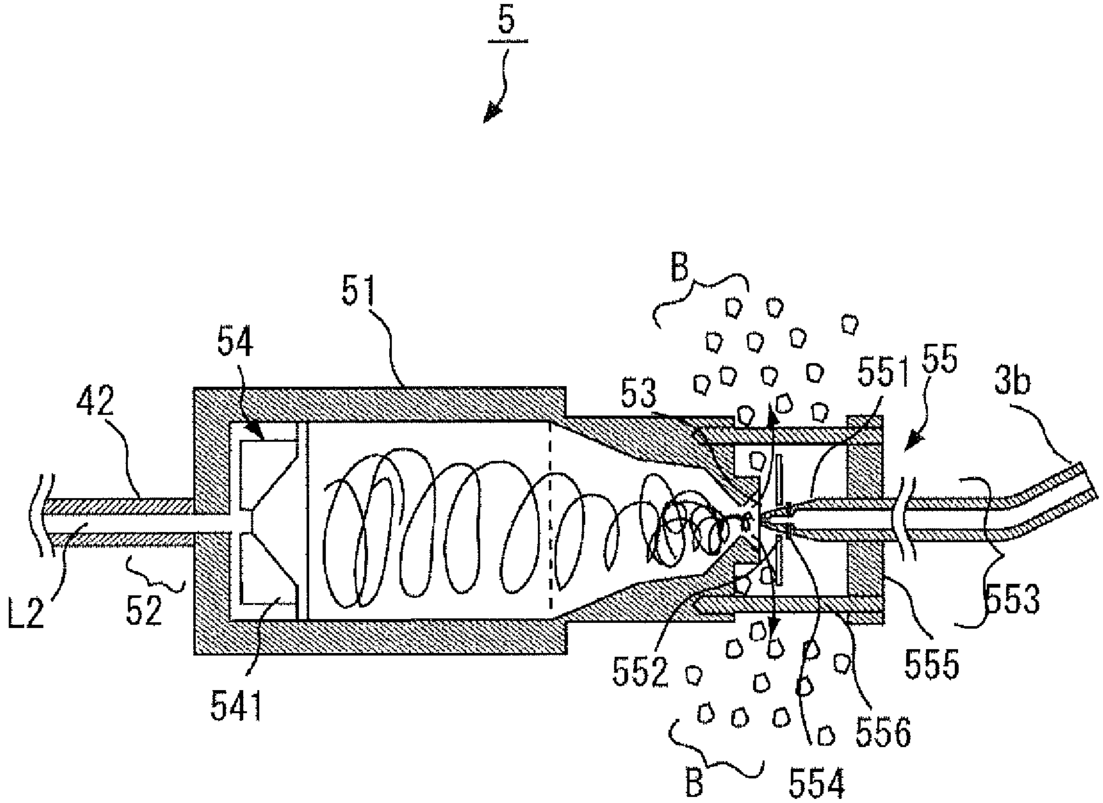

[Fig. 5]

[Fig. 6]
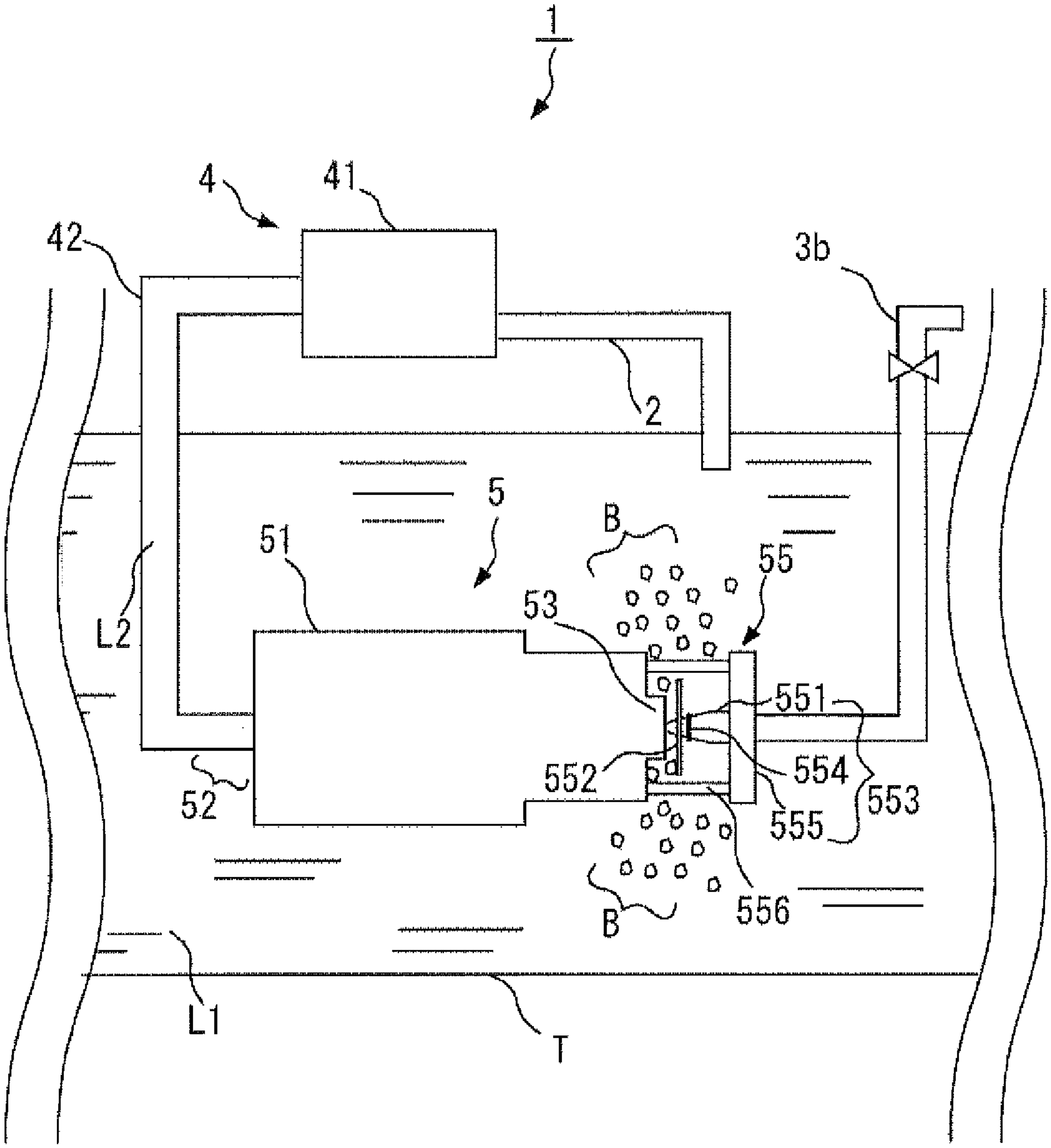

[Fig. 7]
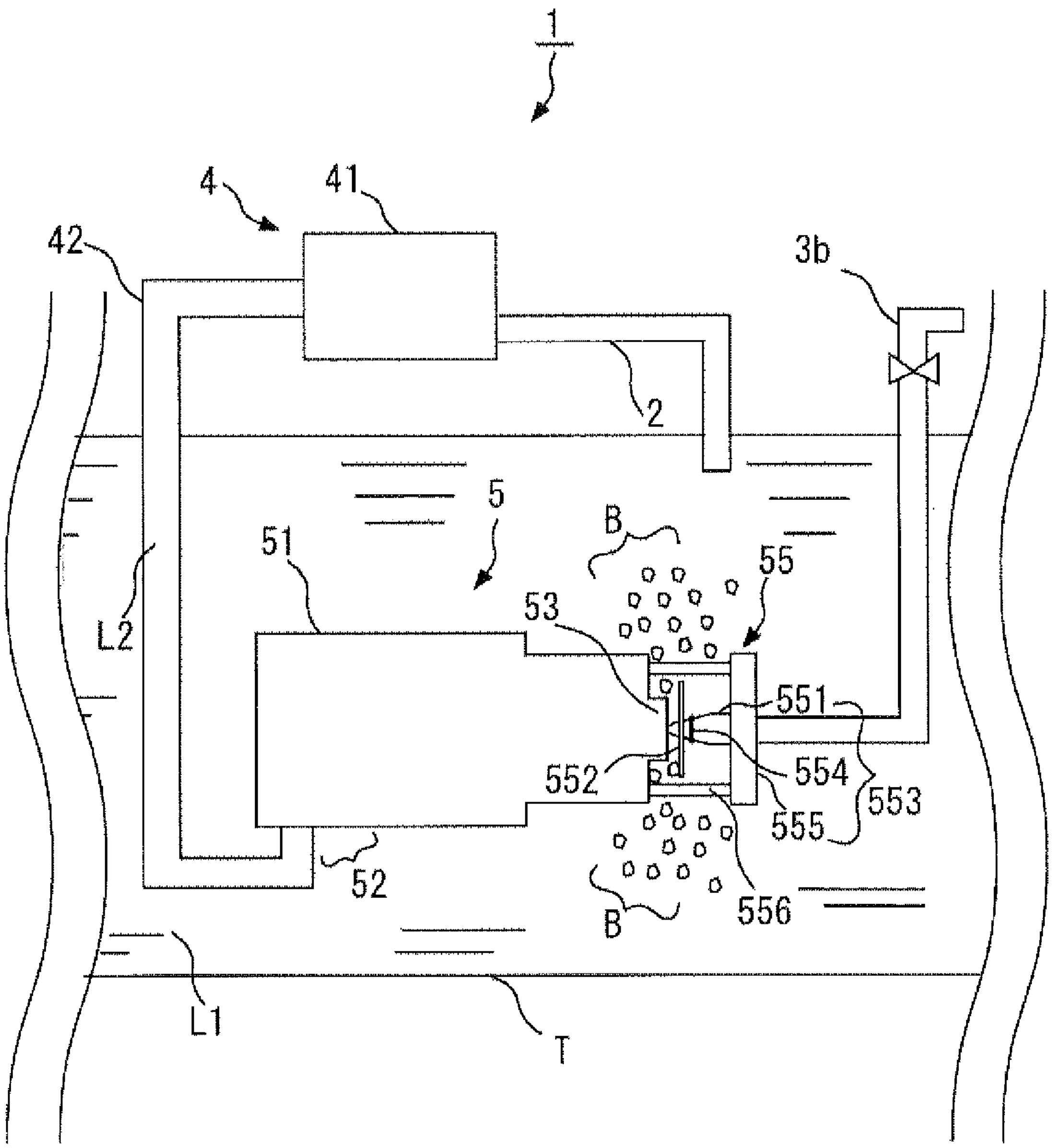

[Fig. 10]
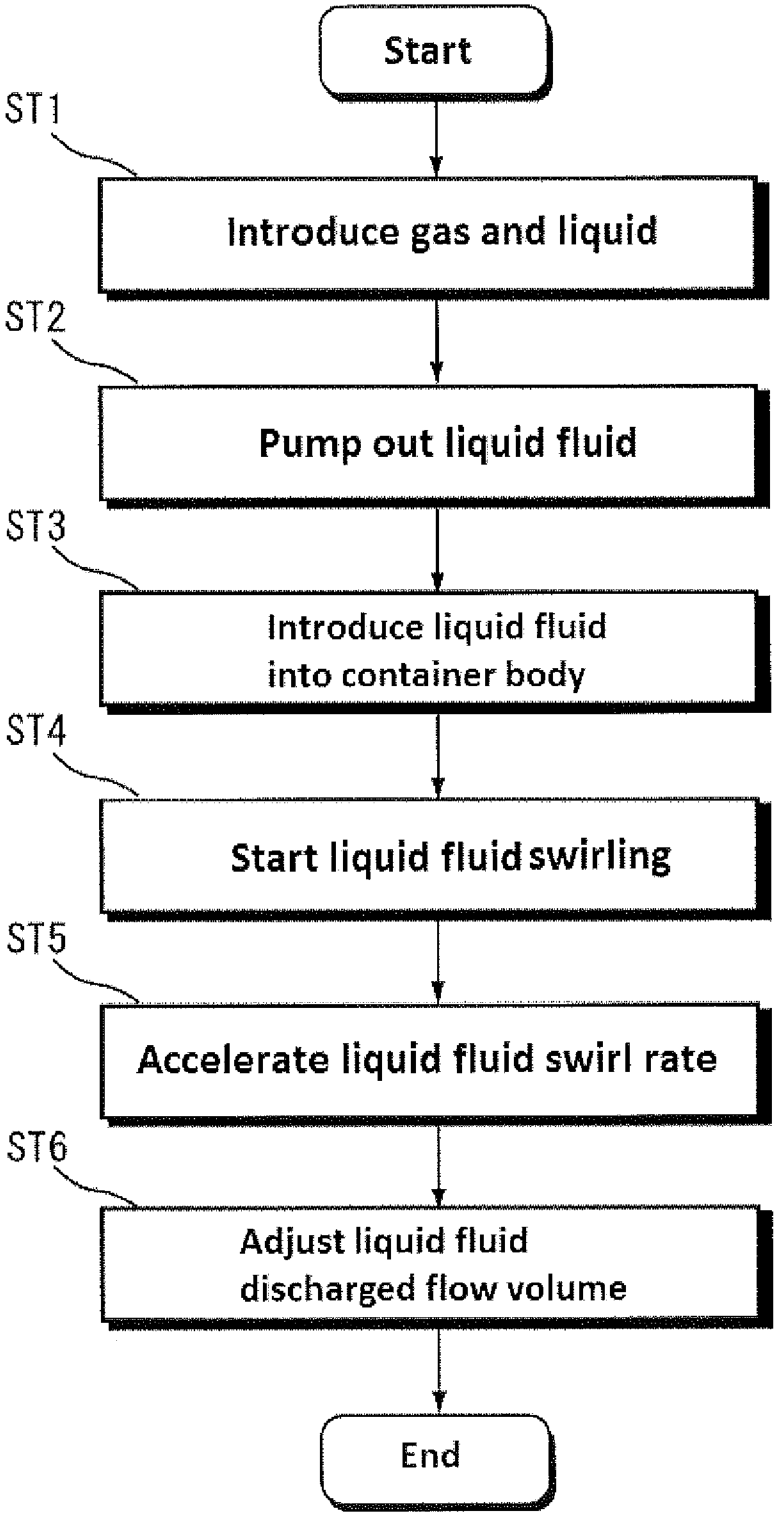

[Fig. 11]
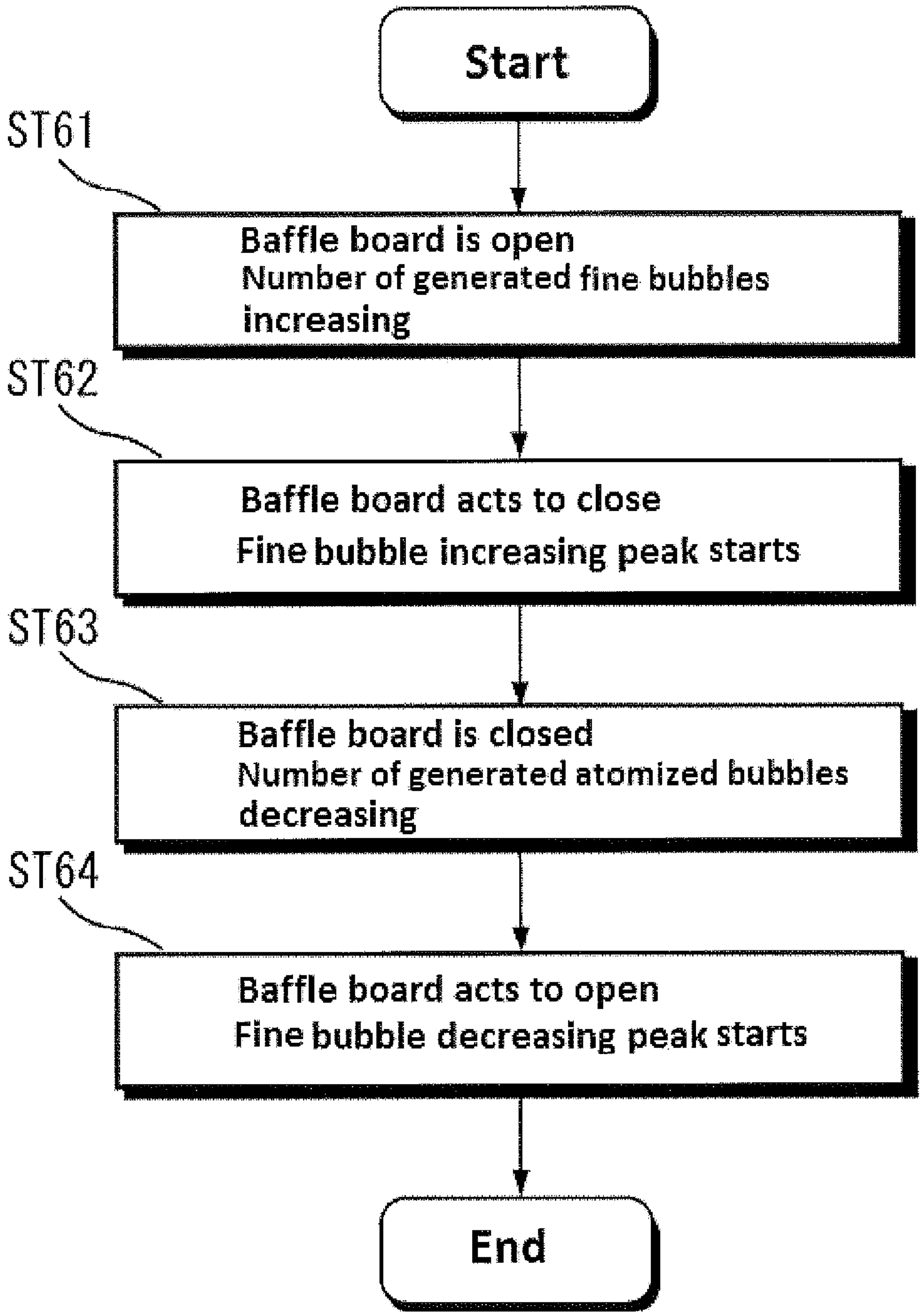

[Fig. 12]
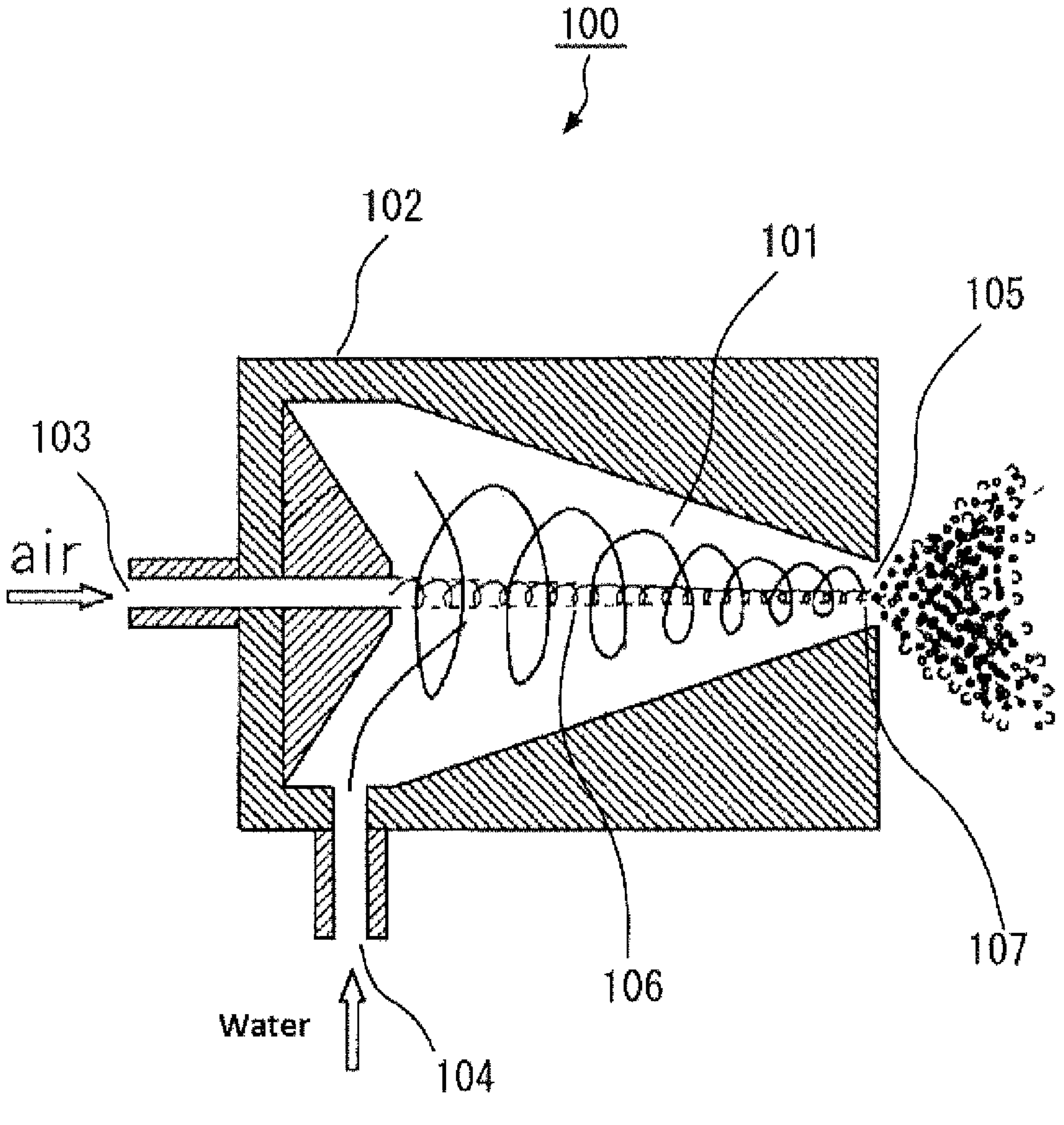

[Fig. 13]
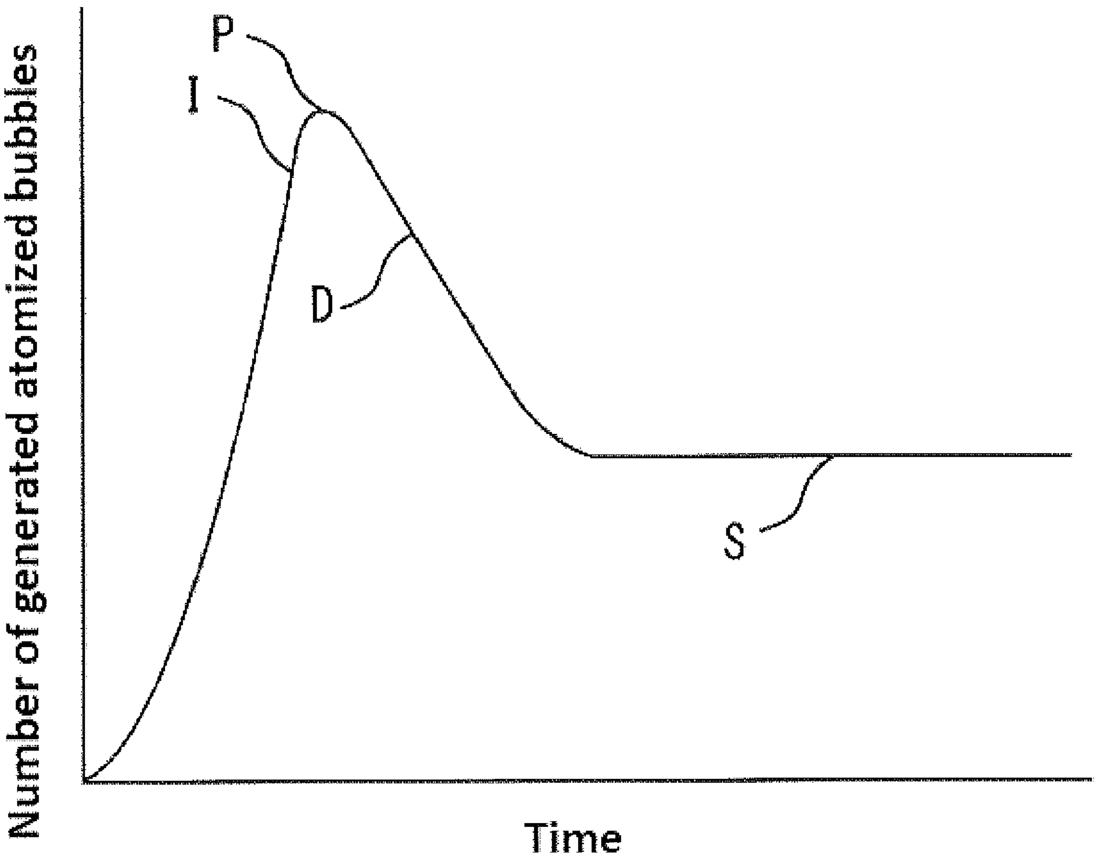

MICROBUBBLE GENERATING DEVICE

TECHNICAL FIELD

The present invention relates to a fine bubble generating device for micronizing introduced gas to generate fine bubbles such as microbubbles or nanobubbles.

BACKGROUND ART

The technology shown in FIG. 12 has been known as such a fine bubble generating device (see, for example, Patent Literature 1). In this fine bubble generating device 100 consisting of a container body 102 with a conical space 101 that is closed on one end with a wall and open on the other end, a gas introducing bore 103 formed on the wall on the one end, and a pressurized liquid introducing inlet 104 formed on a part of an inner wall circumferential surface of the conical space 101 in a tangential direction thereof, the wall on the one end is comprised of a conical or truncated conical shaped part which protrudes out toward the other end, such that the longitudinal cross-sectional shape of the space on the one end has an M shape, and a swirling gas-liquid mixture solution including fine bubbles is drawn out from a swirling gas-liquid drawing outlet 105 of the cylindrical space 101 on the other end.

With the fine bubble generating device 100, a swirl flow is formed from the inlet (pressurized liquid introducing inlet) 104 toward the outlet (swirling gas-liquid drawing outlet) 105 by providing the conical space 101 in a device container. The swirl flow rate and the flow rate towards the outlet simultaneously increase at locations closer to the swirling gas-liquid drawing outlet 105 in accordance with the tapered shape of the conical space 101. By the generation of differences in swirl rates, a strand-like gas whirling tube section 106 is continuously and stably severed, resulting in generation of a large quantity of fine bubbles.

CITATION LIST

Patent Literature

[PTL 1] Japanese Patent No. 4725707

SUMMARY OF INVENTION

Technical Problem

However, the conventional fine bubble generating device 100 disclosed in Patent Literature 1, while capable of generating a large quantity of fine bubbles, had a problem that a generation peak period thereof does not continue when pump water pressure was low. The reason therefor is discussed in detail below while referring to FIG. 13.

First, bubbles are disintegrated and fragmented by the shear force of a swirl flow inside the container body 101, and then the fragmented fine bubbles are strongly discharged from the swirling gas-liquid drawing outlet 105 so that a generation peak period P shown in FIG. 13 starts. At this time, a low liquid pressure section 107 with a very low liquid pressure centered around the gas whirling tube section 106 is formed in the vicinity of the swirling gas-liquid drawing outlet 105 in the container body 102. The low liquid pressure section 107, due to the balance with liquid pressure outside the container body 102, exerts an effect such that liquid from outside the container body 102 flows in toward the swirling gas-liquid drawing outlet 105. As a result, the shear force of the swirl flow is weakened. Eventually, generation of fine bubbles is no longer sustained, and fine bubble generation becomes stable at a low level to settle at a static state S as shown in FIG. 13. That is, a peak period of fine bubble generation starts momentarily, but the state is not sustained.

The present invention was conceived under the aforementioned circumstances. The primary objective of the present invention is to provide a fine bubble generating device, which has a simple configuration and is capable of stably and sustainably discharging a larger quantity of fine bubbles from a discharging section.

Solution to Problem and Advantageous Effects of Invention

According to the fine bubble generating device with respect to the first aspect of the present invention, in a fine bubble generating device comprising a pumping section for pumping a liquid fluid from a liquid, a gas introducing section for introducing gas into the liquid fluid, and the fine bubble generating section used in the liquid for generating fine bubbles in the liquid fluid from the gas introduced from the gas introducing section and the liquid fluid pumped out from the pumping section and discharging the liquid fluid and the fine bubbles to the liquid, the fine bubble generating section can be configured such that the fine bubble generating section comprises a container body, a first liquid fluid introducing section provided on the container body for introducing the liquid fluid pumped out from the pumping section into the container body, a discharging section provided on the container body for discharging the liquid fluid introduced from the first liquid fluid introducing section, a liquid fluid swirling section provided in the container body for making the liquid fluid introduced from the first liquid fluid introducing section swirl in a spiral toward the discharging section, and a discharged flow volume adjusting section for adjusting a discharged flow volume of a liquid fluid from the discharging section to repeatedly generate a first state, in which an increase in discharged flow volume of a liquid fluid from the discharging section leads to a decrease in a liquid pressure around a swirl axis of a swirl generated by the liquid fluid swirling section, resulting in a liquid pressure in the vicinity of the discharging section in the container body being lower than a liquid pressure outside the container body to exert an effect of closing the discharging section, and a second state in which a decrease in the discharged flow volume of a liquid fluid from the discharging section results in a liquid pressure in the vicinity of the discharging section in the container body being higher than a liquid pressure outside the container body to exert an effect of opening the discharging section.

By the aforementioned configuration, as shown in FIG. 1, a fine bubble increasing period Z starts where a liquid fluid introduced into the container body becomes a swirl flow by the liquid fluid swirling section in the container body and the swirl rate thereof increases so that a vortex shear force increases and thereby fine bubbles are further fragmented, and a fine bubble generation peak period P starts where bubbles are strongly discharged from the discharging section due to a liquid pressure in the vicinity of the discharging section in the container body being higher than a liquid pressure outside the container body.

When the discharged flow volume of a liquid fluid from the discharging section starts to increase, the inside of the container body enters a first state in which a liquid pressure around a swirl axis of a swirl generated by the liquid fluid swirling section decreases, resulting in a liquid pressure in the vicinity of the discharging section in the container body being much lower than a liquid pressure outside of the container body to exert an effect of closing the discharging section. For this reason, the fine bubble generation peak period P is not sustained and starts to transition to a fine bubble decreasing period D with decreasing fine bubble generation. As a result, the discharged flow volume of liquid fluid from the discharging section decreases.

However, when the discharged flow volume of liquid fluid from the discharging section starts to decrease, a second state starts in which a liquid pressure in the vicinity of the discharging section in the container body becomes higher than a liquid pressure outside the container body to exert an effect of opening the discharging section. In other words, after the fine bubble increasing period T has started, the fine bubble generation peak period P starts again in which the liquid fluid in the container body is strongly discharged from the discharging section.

That is, since the first state and the second state are repeatedly generated so that the fine bubble generation peak period P repeatedly arises, the average number of generated fine bubbles A increases and thereby the fine bubbles can be stably and sustainably discharged from the discharging section.

According to the fine bubble generating device with respect to the second aspect of the present invention, the discharged flow volume adjusting section can be configured such that the discharged flow volume adjusting section comprises an axis provided approximately perpendicular to the discharging section and supported by the container body, a baffle board that has an insertion bore through which the axis is inserted, the axis being inserted through the baffle board so that the baffle board is movable in the axial direction of the axis, and a stopper section provided to prevent the baffle board from being released from the axis at a position wherea suction force of a low liquid pressure generated in the container body reaches, wherein, when a liquid pressure in the vicinity of the discharging section in the container body is higher than a liquid pressure outside the container body, the baffle board is subjected to an effect to move away from the discharging section by discharge of the liquid flow from the discharging section to open the discharging section, and, when the liquid pressure in the vicinity of the discharging section in the container body is lower than the liquid pressure outside the container body, the baffle board is subjected to an effect to move closer to the discharging section by suction from the discharging section to close the discharging section.

By the aforementioned configuration, a first state starts, in which the discharging section is opened so that a low liquid pressure inside the container body is induced, and the baffle board is pulled by a suction force generated by the low liquid pressure and thereby the discharging section is closed. While the transition to the fine bubble decreasing period D starts and the number of the fine bubbles from the discharging section starts to decrease, a physical stimulation by the baffle board can be applied to the fine bubbles from the discharging section and thereby the fine bubbles from the discharging section in a decreasing trend are fragmented. A large quantity of fine bubbles can be generated again thereby. In other words, the average number of generated fine bubbles A is further increased and thereby the fine bubbles can be stably and sustainably discharged from the discharging section. For instance, FIG. 1 shows a case where physical stimulation by the baffle board is absent, and FIG. 2 shows a case where physical stimulation by a baffle board is applied. As shown in FIG. 2, the discharged flow volume of fine bubbles in the first state increases.

By the aforementioned configuration, the baffle board vibrates or swings to stir the liquid inside a tank, such that fine bubbles in the tank can be uniformly distributed.

Furthermore, according to the fine bubble generating device with respect to the third aspect of the present invention, the axis has an end with a large outer diameter and an end with a small outer diameter and is formed to have an outer diameter that gradually increases from the small outer diameter end to the large outer diameter end, and the stopper section can be configured such that the movement of the baffle board is restricted at a position where the outer diameter of the axis is approximately identical to the inner diameter of the insertion bore of the baffle board.

Furthermore, according to the fine bubble generating device according with respect to the fourth aspect of the present invention, the stopper section comprises a washer through which the axis is inserted, and the stopper section can be configured such that the washer restricts the movement of the baffle board from the discharging section to a direction of discharging a liquid fluid, and acts as a buffering material. By the aforementioned configuration, a washer can suppress variation in movement due to a difference in the material or shape of a baffle board to assist in more stable movement of the baffle board.

Furthermore, according to the fine bubble generating device with respect to the fifth aspect of the present invention, the container body can be configured such that an internal space thereof having an annular shape from a cross-sectional view gradually decreases toward the discharging section. By the aforementioned configuration, an incline is formed on the inner wall of the container body. Thus, the swirl rate of a swirl flow generated in the container body by a liquid fluid swirling section is increased and thereby a vortex shear force is increased so that the bubbles are disintegrated and further fragmented.

Furthermore, according to the fine bubble generating device with respect to the sixth aspect of the present invention, the gas introducing section can be configured to be provided upstream of the pumping section. By the aforementioned configuration, for example, a separate device for introducing gas such as a compressor is no longer required, resulting in simplification of facility and cost reduction.

Furthermore, according to the fine bubble generating device with respect to the seventh aspect of the present invention, the gas introducing section can be configured such that the gas introducing section is provided so that one end of a tube is directed toward the discharging section and, when a liquid pressure in the vicinity of the discharging section in the container body is lower than a liquid pressure outside the container body, gas is introduced into the container body through the tube by suction from the discharging section. By the aforementioned configuration, for example, a separate device for introducing gas such as a compressor is no longer required, resulting in simplification of facility and cost reduction, and gas would not be excessively introduced into the pumping section, resulting in no risk that the pumping section idly spins and thereby breaks.

Furthermore, according to the fine bubble generating device with respect to the eight aspect of the present invention, the gas introducing section can be configured such that the tube and the axis which is tubular are connected. By the aforementioned configuration, the axis can also serve the role of a tube. Furthermore, the tube is secured to the axis thereby to be stabilized.

Furthermore, according to the fine bubble generating device with respect to the ninth aspect of the present invention, the inner wall of the container body has an annular cross-section in the direction of the discharging section, and the first liquid fluid introducing section can be configured so that the liquid fluid is introduced along the tangential direction of the annular shape from a cross-sectional view and thereby the liquid fluid is swirled in a spiral toward the discharging section. By the aforementioned configuration, the first liquid fluid introducing section and the liquid fluid swirling section serve the roles of each other. For instance, a liquid fluid can be swirled in a spiral without separately providing a screw. Thus, the configuration is further simplified and more economical in terms of production or running cost.

Furthermore, according to the fine bubble generating device with respect to the tenth aspect of the present invention, the container body can be configured such that the container body comprises a reverse swirl flow generating wall for separating the container body into a double-layer structure of a main swirl chamber and a preliminary swirl chamber and a second liquid fluid introducing section provided on the reverse swirl flow generating wall for introducing the liquid fluid from the preliminary swirl chamber to the main swirl chamber so that a second swirl flow in the opposite direction from a first swirl flow introduced from the first liquid fluid introducing section generates. By the aforementioned configuration, bubbles are disintegrated and fragmented by a vortex shear force generated when the first swirl flow is changed to a second swirl flow in the direction opposite to the first swirl flow by the second liquid fluid introducing section.

Furthermore, according to the fine bubble generating device with respect to the eleventh aspect of the present invention, in a fine bubble generating device comprising a pumping section for pumping a liquid fluid from a liquid, a gas introducing section for introducing gas into the liquid fluid, and the fine bubble generating section used in the liquid for generating fine bubbles in the liquid fluid from the gas introduced from the gas introducing section and the liquid fluid pumped out from the pumping section and discharging the liquid fluid and the fine bubbles to the liquid, a fine bubble generating section is configured such that the fine bubble generating section comprises a container body, a first liquid fluid introducing section for introducing a liquid fluid pumped out from the pumping section into the container body, a discharging section for discharging the liquid fluid, and a liquid fluid swirling section for making the liquid fluid introduced from the first liquid fluid introducing section swirl in a spiral toward the discharging section, wherein the container body comprises a reverse swirl flow generating wall for separating the container body into a double-layer structure of a main swirl chamber and a preliminary swirl chamber and a second liquid fluid introducing section provided on the reverse swirl flow generating wall for introducing the liquid fluid from the preliminary swirl chamber to the main swirl chamber so that a second swirl flow in the opposite direction from a first swirl flow introduced from the first liquid fluid introducing section generates. By the aforementioned configuration, bubbles are disintegrated and fragmented by a vortex shear force generated when the first swirl flow is changed to the second swirl flow in the direction opposite to the first swirl flow by the second liquid fluid introducing section.

Furthermore, according to the fine bubble generating device with respect to the twelfth aspect of the present invention, in a fine bubble generating section of a fine bubble generating device comprising a pumping section for pumping a liquid fluid from a liquid, a gas introducing section for introducing gas into the liquid fluid, and the fine bubble generating section used in the liquid for generating fine bubbles in the liquid fluid from the gas introduced from the gas introducing section and the liquid fluid pumped out from the pumping section and discharging the liquid fluid and the fine bubbles to the liquid, the fine bubble generating section can be configured such that the fine bubble generating section comprises a container body, a first liquid fluid introducing section provided on the container body for introducing a liquid fluid pumped out from the pumping section into the container body, a discharging section provided on the container body for discharging a liquid fluid introduced from the first liquid fluid introducing section, a liquid fluid swirling section provided in the container body for making the liquid fluid introduced from the first liquid fluid introducing section swirl in a spiral toward the discharging section, and a discharged flow volume adjusting section for adjusting a discharged flow volume of a liquid fluid from the discharging section to repeatedly generate a first state, in which an increase in discharged flow volume of a liquid fluid from the discharging section leads to a decrease in a liquid pressure around a swirl axis of a swirl generated by the liquid fluid swirling section, resulting in a liquid pressure in the vicinity of the discharging section in the container body being lower than a liquid pressure outside the container body to exert an effect of closing the discharging section, and a second state in which a decrease in the discharged flow volume of a liquid fluid from the discharging section results in the liquid pressure in the vicinity of the discharging section in the container body being higher than the liquid pressure outside the container body to exert an effect of opening the discharging section.

BRIEF DESCRIPTION OF DRAWINGS

FIG. 1 is a schematic diagram for explaining the principle of stably and sustainably generating fine bubbles in the present invention and showing the number of generated fine bubbles when a physical stimulation by a baffle board is not taken into consideration.

FIG. 2 is a schematic diagram for explaining the principle of stably and sustainably generating fine bubbles in the present invention and showing the number of generated fine bubbles when a physical stimulation by a baffle board is taken into consideration.

FIG. 3 is a schematic diagram showing the configuration of the fine bubble generating device according to the first Example of the present invention.

FIG. 4 is a cross-sectional view in the longitudinal direction of the fine bubble generating section according to the present invention.

FIG. 5 is a diagram provided to explain the shape of the inner wall of the container body of the present invention.

FIG. 6 is a schematic diagram of the fine bubble generating device according to the second Example of the present invention.

FIG. 7 is a schematic diagram of the fine bubble generating device according to the third Example of the present invention.

8B is a cross-sectional view that is transverse with respect to the direction toward the discharging section.

Figure 9A:
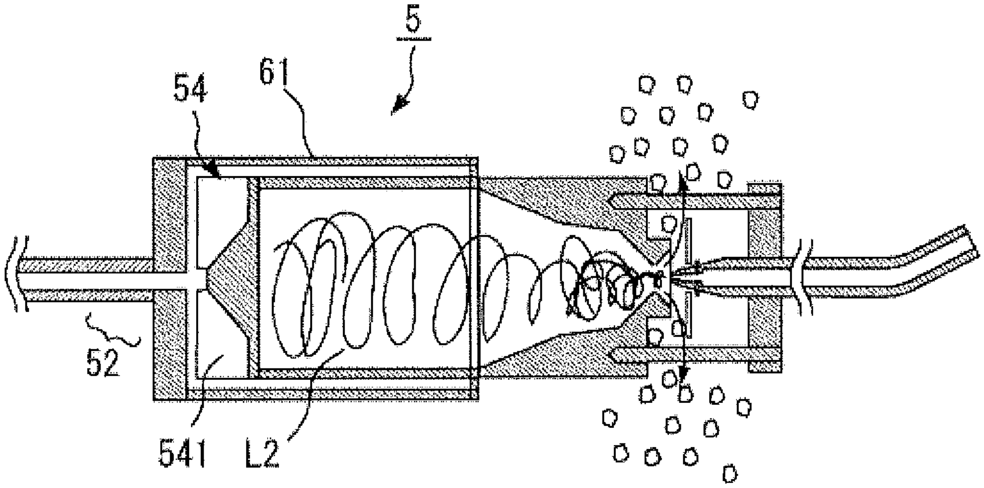
Figure 9B:
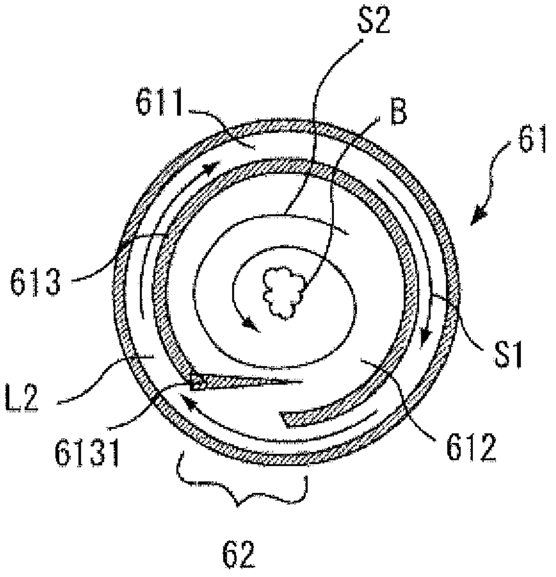

FIG. 9 is a diagram provided to explain the structure of the inner wall of the container body of the present invention. FIG. 9A is a cross-sectional view in the longitudinal direction, and FIG. 9B is a cross-sectional view in the transverse direction.

FIG. 10 is a flow chart showing the operation of the fine bubble generating device according to the first Example of the present invention.

FIG. 11 is a flow chart showing the operation of the discharged flow volume adjusting section according to the first Example of the present invention.

FIG. 12 is a schematic diagram of a conventional example of a device for rotating a suction fin to generate a liquid flow thereby to draw in gas into the liquid flow and repeating shearing and stirring of a gas-liquid mixture fluid to generate fine bubbles.

FIG. 13 is a schematic diagram of a conventional example for explaining the principle of generating fine bubbles.

DESCRIPTION OF EMBODIMENTS

The embodiments of the present invention are explained hereinafter based on the drawings. However, the embodiments set forth below are examples for materialization of the technical idea of the present invention. The present invention is not limited thereto. Further, the present specification is not intended to specify the components set forth in the Claims to the components in the embodiments. In particular, the dimension, material, shape, relative arrangement, and the like of constituents described in the embodiments are merely examples used for explanation and are not intended to limit the scope of the present invention thereto, unless specifically noted otherwise. The size, positional relationship, or the like of a component in each diagram may be exaggerated to clarify the explanation. Furthermore, the same names and symbols in the following explanation indicate the same or similar-quality components. Detailed explanation thereof is omitted when appropriate. Furthermore, each element constituting the present invention can be materialized as an embodiment in which multiple elements are configured by a single member so that the single member is used for multiple elements, or in which, conversely, function of a single member is shared by multiple members.

First Embodiment

Configuration of Fine Bubble Generating Device

FIG. 3 shows a schematic diagram illustrating the entire configuration of fine bubble generating device 1 according to one embodiment of the present invention. As shown in FIG. 3, the fine bubble generating device 1 comprises, as main parts, a liquid introducing section 2 for introducing a liquid L1 in a tank T, a gas introducing section 3*a* for introducing gas, a pumping section 4 for pumping a liquid fluid L2 sent via the liquid introducing section 2 and gas sent via the gas introducing section 3*a*, and a fine bubble generating section 5 for generating fine bubbles B in the liquid fluid L2 pumped out from the pumping section 4 and discharging the fine bubbles B into the liquid L1.

For convenience, a liquid pumped out by the pumping section 4 is defined as the liquid fluid L2 and any other liquids existing in the tank T are defined as the liquid L1. Water is generally used as the liquid L1, but the liquid L1 is not limited thereto. Liquid may be solvents such as toluene, acetone, and alcohol, fuels such as petroleum and gasoline, food and beverages such as edible oils and fats, butter, ice cream, and beer, medicines such as nutritional drinks, health products for bathing or the like, environmental water such as lake water and contaminated water in purification tanks, and the like.

The liquid introducing section 2 is, for example, a tube. The liquid introducing section 2 is provided upstream of the pumping section 4. The liquid introducing section 2 serves the role of a suction inlet when the pumping section 4 suctioning the liquid L1 and is used as a flow channel.

The gas introducing section 3*a* is, for example, a tube. In the first Example, the gas introducing section 3*a* is provided upstream of the pumping section 4. The gas introducing section 3*a* serves the role of a suction inlet and a flow channel when the pumping section 4 suctioning gas, such as ambient air. In addition, one end of the tube is directed toward the fine bubble generating section 5 in the second Example discussed below.

The pumping section 4 comprises, for example, a pump 41 for pumping gas, liquid, or the like by pressurizing drive and a tube 42 with one end connected to the pump 41 and the other end connected to the fine bubble generating section 5 as main parts. In the pumping section 4, the pump 41 simultaneously suctions the liquid L1 and gas via the liquid introducing section 2 and the gas introducing section 3*a*, respectively, mixes the liquid fluid L2 and gas via the tube 42 to pump them to the fine bubble generating section 5.

Configuration of Fine Bubble Generating Section

As shown in FIG. 4, the fine bubble generating section 5 comprises, as main parts, a container body 51 for housing the liquid fluid L2, a first liquid fluid introducing section 52 for introducing the liquid fluid L2 pumped out from the pumping section 4 into the container body 51, a discharging section 53 for discharging the liquid fluid L2 in the container body 51 into the liquid L1, a liquid fluid swirling section 54 for making the liquid fluid L2 swirl in a spiral toward the discharging section 53, and a discharged flow volume adjusting section 55 for adjusting the discharged volume of the liquid fluid L2 from the fine bubble generating section 5.

Figure 5A:
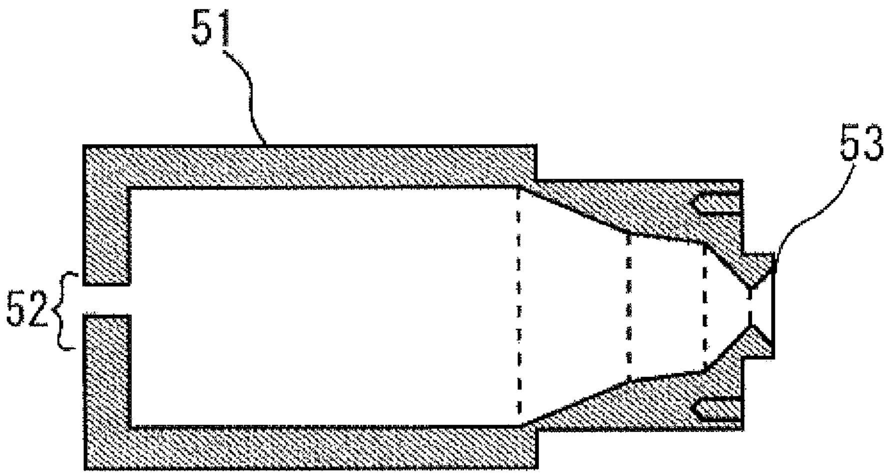
FIG. 5A shows an example of a stepped tapered shape.
Figure 5B:
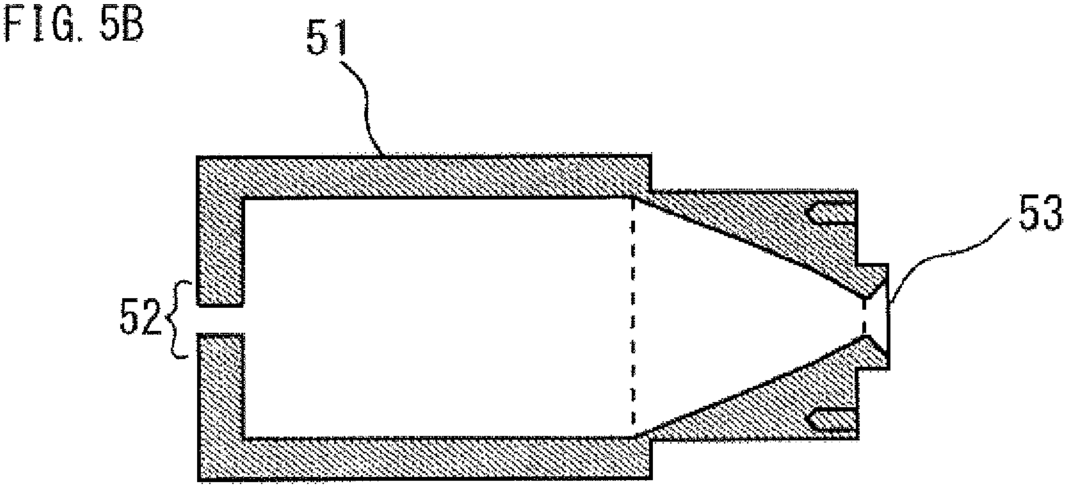
FIG. 5B shows an example of a tapered shape.

The container body 51 is provided with an inner wall gradually tapering toward the discharging section 53 in an annular shape from cross-sectional view, so that the swirl rate of a swirl flow generated by the liquid fluid swirling section 54 in the container body 51 is increased and thereby the vortex shear force increases to disintegrate and further fragment bubbles. For example, the stepped tapered shape shown in FIG. 5A is preferred. Thus multiple steps of inclines with different angles are provided, such that the swirl rate is rapidly increased for each step. Thereby, the vortex shear force is increased, so that the fine bubbles B are disintegrated and further fragmented. In addition, the inner wall of the container body 51 may have a tapered shape without steps, as shown in FIG. 5B.

In the container body 51, the outer shape is formed, for example, in a cylindrical shape or a shape conforming to the shape of the inner wall. In the case of a cylindrical shape, as the outer shape is simply formed cylindrically regardless of the shape of the inner wall, manufacturing can be readily performed. In the case of a shape conforming to the shape of the inner wall, as the outer shape is fitted to the shape of the inner wall, the container body 51 does not have excessive thickness, so that material cost can be kept low.

The first liquid fluid introducing section 52 is provided at the end on the upstream side of the container body 51, and serves the role of an introducing inlet for introducing the liquid fluid L2 pumped out from the pumping section 4 into the container body 51. The liquid fluid L2 introduced from the first liquid fluid introducing section 52 flows toward the discharging section 53 positioned downstream.

The discharging section 53 is provided at the end on the downstream side of the container body 51 and discharges the liquid fluid L2 out of the container body 51, the liquid fluid L2 being introduced from the first liquid fluid introducing section 52 and being swirling in a spiral.

For example, the discharging section 53, as shown in FIG. 4, is formed into a shape of the neck of a bottle, therefore, the pressure of the liquid fluid L2 swirling in a spiral is first increased due to a rapid decrease of inner diameter at the thinnest area in the shape of the neck of a bottle, and then the pressure is rapidly decreased due to a gradual increase of the inner diameter toward the outside of the container body 51. By such variation in pressure, the fine bubbles B contained in the liquid fluid L2 are further pulverized to become finer bubbles. Moreover, as long as the discharging section 53 can discharge the liquid fluid L2 swirling in a spiral toward the outside of the container body 51 to generate finer bubbles, the shape thereof is not limited.

The liquid fluid swirling section 54 is, for example, a screw 541 provided with multiple blades, the screw 541 being rotatably provided on the first liquid fluid introducing section 52 side in the container body 51. The screw 541 is rotated by the liquid fluid L2 transported from the pumping section 4. The liquid fluid L2 becomes a swirl flow by the rotation of the screw 541. In this manner, the liquid fluid swirling section 54 sends out the liquid fluid L2 introduced from the first liquid fluid introducing section 52 toward the discharging section 53 while making the liquid fluid L2 swirl in a spiral.

As shown in FIG. 3, the discharged flow volume adjusting section 55 comprises, as main parts, an axis 551 provided approximately perpendicular to the discharging section 53 and supported by the container body 51, a baffle board 552 having an insertion bore 5521 (not shown) through which the axis 551 is inserted, and a stopper section 553 provided to prevent the baffle board 552 from being released from the axis 551.

The axis 551 is, for example, a tube and is supported, for example, by a stainless steel board 555 as shown in FIG. 3 so that the axis 551 can be inserted through and support the baffle board 552. The stainless steel board 555 is connected to the container body 51 via a bolt 556. Further, one end of the axis 551 is directed toward the discharging section 53 side, and the gas introducing section 3*b* is connected to the other end in the second Example discussed below. Moreover, in the first Example, the axis 551 only need to serve the role of an axis. The axis does not need to be a tube. Further, as long as the stainless steel board 555 and the bolt 556 can support the axis 551, the material and the shape thereof are not limited.

The baffle board 552 is, for example, a disk made of stainless steel having the insertion bore 5521 approximately in the center. The axis 551 is inserted through the insertion bore 5521 so that the baffle board 552 is movable between the discharging section 53 and the stopper section 553 in the axial direction of the axis 551, and the baffle board 552 acts to open and close the discharging section 53 to adjust the discharged flow volume of the liquid fluid L2 from the discharged section 53. Moreover, as long as the baffle board 552 acts to open and close the discharging section 53 to allow adjustment of the discharged flow volume, the material or shape thereof is not limited.

The stopper section 553 serves the role of a stopper. For example, the axis 551 has an end with a large outer diameter and an end with a small outer diameter and is formed to have an outer diameter that gradually increases from the small outer diameter end to the large outer diameter end, and further the movement of the baffle board 552 is restricted at a position where the diameter of the insertion bore 5521 of the baffle board 552 is identical to the diameter of the axis 551.

For example, the stopper section 553 has a washer 554 through which the axis 551 is inserted. The washer 554 is disposed, for example, more toward the stainless steel board 555 than the baffle board 552 and serves the role of a stopper for preventing the release of the baffle board 552 from the axis 551 and the role of assisting a more stable movement of the baffle board 552. The stopper section 553 is not limited to the aforementioned member. The role of a stopper may also be provided by the stainless steel board 555 in the stopper section 553.

Operation of Fine Bubble Generating Device

Next, the operation of the fine bubble generating device 1 according to the first Example of the present invention is explained while referring to the schematic diagram related to the number of generated fine bubbles in FIG. 3, the cross-sectional view in the longitudinal direction of a fine bubble generating section in FIG. 4, the diagram showing the shape of an inner wall of a container body in FIG. 5, and the flow chart in FIG. 10.

The flow of the entire operation of the fine bubble generating device 1 according to the first Example is explained while referring to the flow chart in FIG. 10.

In step ST1, the pump 41 suctions the liquid L1 in the tank T via the liquid introducing section 2 into the pumping section 4 and external gas via the gas introducing section 3*a* into the pumping section.

In step ST2, the pump 41 forms the liquid fluid L2 by mixing the liquid L1 and the gas suctioned in by step ST1, and pumps out the liquid fluid L2 to the container body 51 via the tube 42 and the first liquid fluid introducing section 52.

In step ST3, the screw 541 directs the liquid fluid L2 pumped out by step ST2 toward the discharging section 53 to generate a strong flow swirling in a spiral along the inner wall of the container body 51 and increases the shear force to fragment bubbles.

In step ST4, the stepped tapered shape of the container body 51 shown in FIGS. 3 and 5A rapidly increases the swirl rate of a swirl flow of the liquid fluid L2 generated by step ST3 at each stepped portion to increase the shear force, which disintegrates and fragments bubbles contained in the liquid fluid L2 to generate the fine bubbles B.

In step ST5, the discharging section 53 with a shape of the neck of a bottle shown in FIG. 4 strongly discharges the liquid fluid L2 and the fine bubbles B out of the container body, the swirl rate of the liquid fluid L2 having been increased in step ST4.

In step ST6, the baffle board 552 supported by the axis 551 moves so as to open or close the discharging section 53 thereby to adjust the discharged volume of the liquid fluid L2 that is discharged from the discharging section 53.

Operation of Discharged Flow Volume Adjusting Section

In this regard, the operation of step ST6 is explained hereinafter in detail while referring to FIGS. 1 and 2 and the flow chart in FIG. 11.

In step ST61, the liquid fluid L2 introduced into the container body 51 becomes a swirl flow by the liquid fluid swirling section 54 in the container body 51 and the swirl rate thereof increases. Whereby, the fine bubble increasing period I starts in which the vortex shear force increases and bubbles are further fragmented.

In step ST62, when the fine bubble increasing period I starts in step ST61 as shown in FIG. 1, in the liquid fluid L2 introduced into the container body 51, a liquid pressure in the vicinity of the discharging section 53 in the container body 51 becomes higher than the liquid pressure outside the container body 51. Thus, the generation peak period P of the fine bubble B starts in which the liquid fluid L2 is strongly discharged from the discharging section 53.

As shown in FIG. 1, in step ST63, when the discharged flow volume of the liquid fluid L2 from the discharging section 53 starts to increase, a liquid pressure around a swirl axis of a swirl generated by the liquid fluid swirling section 54 decreases inside the container body 51, and thereby a liquid pressure in the vicinity of the discharging section 53 in the container body 51 becomes much lower than a liquid pressure outside the container body 51. Whereby, the baffle board 552 enters a first state in which the baffle board 552 is subjected to an effect to close the discharging section 53. For this reason, the generation peak period P of the fine bubble B does not continue and starts to transition to the fine bubble decreasing period D in which generation of the fine bubbles B decreases. As a result, the discharged flow volume of the liquid fluid L2 from the discharging section 53 decreases.

When the transition to the fine bubble decreasing period D starts, a physical stimulation by the baffle board 552 can be applied to the liquid fluid L2 from the discharging section 53 and thereby the discharged flow volume of the liquid fluid L2 from the discharging section 53 decreases and the fine bubbles B in a decreasing trend are further fragmented. Thus, a large quantity of fine bubbles B can be generated again, as illustrated by the first waveform in FIG. 2. Further, when adjusting such as pumping section 4, discharged flow volume adjusting section 55, and the shape of the container body 51 to shorten the interval between first state and the second state, the number of generated fine bubbles B would exhbit the second waveform in FIG. 2 and the generation peak period P appears more frequently.

In step ST64, when the discharged flow volume of the liquid fluid L2 from the discharging section 53 starts to decrease, a liquid pressure in the vicinity of the discharging section 53 in the container body 51 becomes higher than a liquid pressure outside the container body 51. In the result, the baffle board 552 enters a second state in which the baffle board 552 is subjected to an effect to open the discharging section 53. In other words, after the fine bubble increasing period I has started, the generation peak period P of the fine bubble B starts again in which the liquid fluid L2 in the container body 51 is strongly discharged from the discharging section 53.

That is, as the first state and the second state are iteratively occur and thereby the generation peak period P of the fine bubble B repeatedly arises, the average number of generated fine bubbles A can be increased and the fine bubbles B can be stably and sustainably discharged from the discharging section 53.

As shown in the third waveform of FIG. 2, the pressures from both sides via the baffle board 552 generated in the first state and the second state may be equalized so that the baffle board 552 may vibrate and swing at a predetermined position to more stably generate the fine bubbles B.

Second Example

In the first Example, the gas introducing section 3*a* is provided upstream of the pumping section 4 and the pumping section 4 functions as a drive source for suctioning gas such as ambient air. Thereby, a separate device for introducing gas such as a compressor is no longer required, resulting in the effect of simplifying a facility and reducing cost, but the same effect can be attained as follows.

FIG. 6 is a schematic diagram of the fine bubble generating device 1 according to the second Example of the present invention. In the second Example, the gas introducing section 3*b* is connected to the tube shaped axis 551 instead of upstream of the pumping section 4. Thereby, gas is suctioned into the container body 51 via the gas introducing section 3*b* by the suction force from the discharging section 53 generated when the liquid pressure in the vicinity of the discharging section 53 in the container body 51 becomes lower than the liquid pressure outside the container body 51 as the discharged flow volume of the liquid fluid L2 from the discharging section 53 increases. The gas suctioned via the gas introducing section 3*b* is mixed with the liquid fluid L2 to become a swirl flow in the container body 51 and is discharged as the liquid fluid L2 comprising the fine bubbles B from the discharging section 53 when the liquid pressure in the vicinity of the discharging section 53 in the container body 51 becomes higher than the liquid pressure outside the container body 51 with a decrease in the discharged flow volume of the liquid fluid L2 from the discharging section 53 to exert an effect to open the discharging section 53. As a result, a separate device for introducing gas such as a compressor is no longer required, resulting in simplification of a facility and cost reduction. In addition, gas would not be excessively introduced into the pumping section 4, so that there is no risk of the pumping section 4 idly spinning and breaking.

Third Example

In the first Example and the second Example, the liquid fluid swirling section 54 is provided, so that the screw 541 provided on the first liquid fluid introducing section 52 side in the container body 51 is rotated by the liquid pressure of the liquid fluid L2 sent out from the pumping section 4 to send out the liquid fluid L2 introduced from the first liquid fluid introducing section 52 toward the discharging section 53 while making the liquid fluid L2 swirl in a spiral. Meanwhile, the same effect can be attained as follows.

Figure 8A:
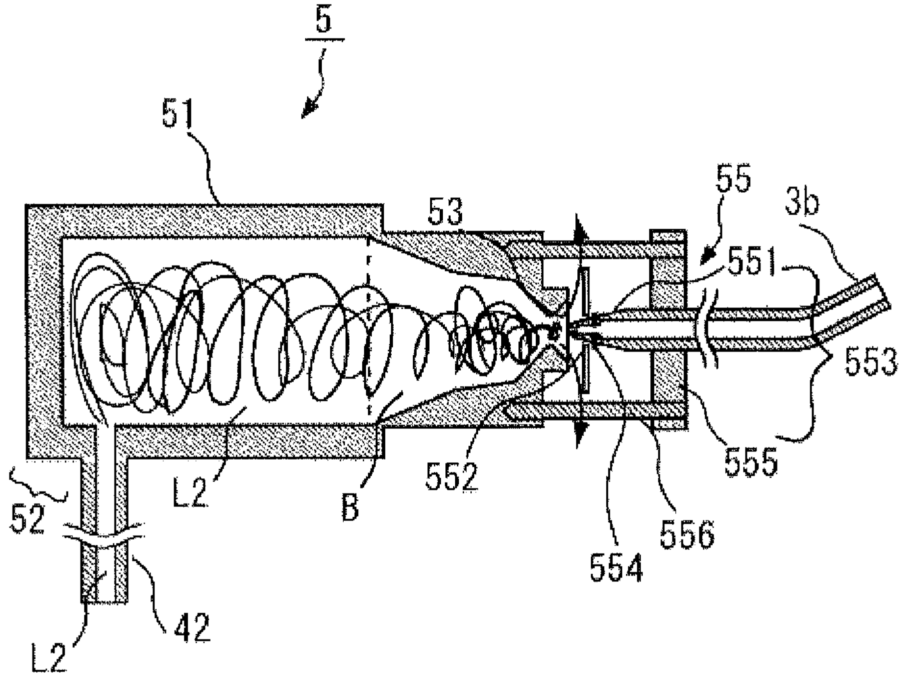
FIG. 8A is a cross-sectional view in the longitudinal direction, and FIG.
Figure 8B:
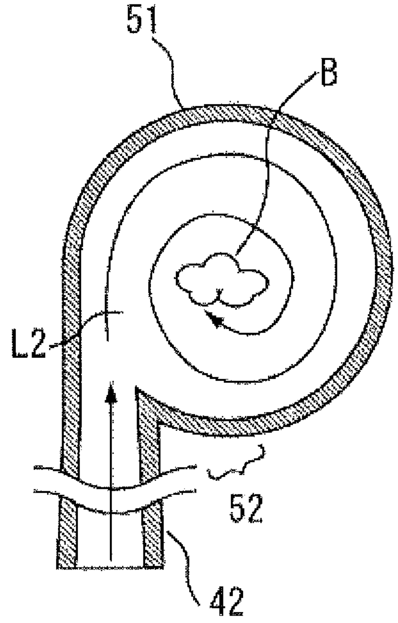
FIG. 8 is an expanded diagram of the fine bubble generating section of the fine bubble generating device according to the third Example of the present invention.

FIG. 7 is a schematic diagram of the fine bubble generating device 1 according to the third Example of the present invention. FIG. 8A is a cross-sectional view in the longitudinal direction of the fine bubble generating section 5, and FIG. 8B is a cross-sectional view that is transverse to the direction towards the discharging section. In the third Example, without providing the liquid fluid swirling section 54, the first liquid fluid introducing section 52 is provided on a part of the circumferential surface of the container body 51 so that the liquid fluid L2 is introduced along the tangential direction of the annular shape from the cross-sectional view to allow the liquid fluid L2 to swirl in a spiral toward the discharging section 53. Thereby, the first liquid fluid introducing section 52 also serves the role of the liquid fluid swirling section 54. For instance, the liquid fluid L2 can be swirled in a spiral without separately providing the screw 541. Thus, the configuration is further simplified and economical in terms of production cost or running cost.

Fourth Example

In the first to third Examples, the fine bubble generating section 5 is comprised of the container body 51, the first liquid fluid introducing section 52, the discharging section 53, the liquid fluid swirling section 54, and the discharged flow volume adjusting section 55. Meanwhile, a similar effect can also be attained as follows.

FIG. 9A is a cross-sectional view in the longitudinal direction of the fine bubble generating section 5, and FIG. 9B is a cross-sectional view in the transverse direction. In the fourth Example, without providing the discharged flow volume adjusting section 55, as shown in FIG. 9A, the container body 51*a* is modified to a container body 61 of a double-layer structure. The container body 61 comprises a preliminary swirl chamber 611 and a main swirl chamber 612 and a reverse swirl flow generating wall 613 as the main parts.

The preliminary swirl chamber 611 is a space formed on the outside of the reverse swirl flow generating wall 613 discussed below. A first swirl flow S1 is introduced from the first liquid fluid introducing section 52. The first swirl flow S1 is swirled by the screw 541 and swirls in the same direction as the screw 541.

The main swirl chamber 612 is a space formed inside the reverse swirl flow generating wall 613 discussed below. A second swirl flow S2 is introduced from a second liquid fluid introducing section 62 discussed below. The second swirl flow S2 swirls in the opposite direction from the first swirl flow S1 due to a collision board 6131 discussed below.

The second liquid fluid introducing section 62 comprises the reverse swirl flow generating wall 613 and the collision board 6131 as the main constituents. As shown in FIG. 9B, the second swirl flow S2 is generated by the first swirl flow S1 colliding with the collision board 6131.

Thereby, bubbles are disintegrated and fragmented by a vortex shear force generated when a first swirl flow is changed into a second swirl flow in the opposite direction from the first swirl flow.

In view of the above, the present invention is capable of stably and sustainably discharging a large quantity of fine bubbles from a discharging section with a simple configuration.

In addition, it is understood that the present invention is not limited to only the aforementioned embodiments and various modifications can be made thereto within the scope that does not depart from the substance of the present invention.

REFERENCE SIGNS LIST

1 . . . fine bubble generating device, 2 . . . liquid introducing section, 3*a*, 3*b* . . . gas introducing section, 4 . . . pumping section, 41 . . . pump, 42 . . . tube, 5 . . . fine bubble generating section, 51 . . . container body, 52 . . . first liquid fluid introducing section, 53 . . . discharging section, 54 . . . liquid fluid swirling section, 541 . . . screw, 55 . . . discharged flow volume adjusting section, 551 . . . axis, 552 . . . baffle board, 5521 . . . insertion bore, 553 . . . stopper, 554 . . . washer, 555 . . . stainless steel board, 556 . . . bolt, 61 . . . container body, 611 . . . preliminary swirl chamber, 612 . . . main swirl chamber, 613 . . . reverse swirl flow generating wall, 6131 . . . collision board, 62 . . . second liquid fluid introducing section, S1 . . . first swirl flow, S2 . . . second swirl flow, T . . . tank, L1 . . . liquid, L2 . . . liquid fluid, A . . . average number of generated fine bubbles, B . . . fine bubbles, D . . . fine bubble decreasing period, I . . . fine bubble increasing period, P . . . generation peak period

The invention claimed is:

1. A fine bubble generating device comprising a pump for pumping a liquid fluid from a liquid, a gas introducing inlet for introducing gas into the liquid fluid, and a fine bubble generating section used in the liquid for generating fine bubbles in the liquid fluid from the gas introduced from the gas introducing inlet and the liquid fluid pumped out from the pump and discharging the liquid fluid and the fine bubbles to the liquid, the fine bubble generating section comprising:
- a container body;
- a first liquid fluid introducing inlet provided on the container body for introducing the liquid fluid pumped out from the pump into the container body;
- a discharging outlet provided on the container body for discharging the liquid fluid introduced from the first liquid fluid introducing inlet;
- a liquid fluid swirling section provided in the container body for making the liquid fluid introduced from the first liquid fluid introducing inlet swirl in a spiral toward the discharging outlet; and
- a discharged flow volume adjusting section comprising:
  - a baffle board that is movable in an approximately perpendicular direction to an end face of the discharging outlet by the swirled liquid flow generated by the liquid fluid swirling section,
  - an axle extending along an axial direction approximately perpendicular to the end face of the discharging outlet and supported by the container body, and
  - an insertion bore of the baffle board through which the axle is inserted, the axle being inserted through the baffle board so that the baffle board is movable in the axial direction of the axle through the insertion bore.

2. The fine bubble generating device of claim 1, wherein the container body has a shape in which an inner wall having an annular shape from the cross sectional view gradually decreases toward the discharging outlet.

3. The fine bubble generating device of claim 1, wherein the gas introducing inlet is provided upstream of the pump.

4. The fine bubble generating device of claim 1, wherein the gas introducing inlet is provided, so that one end of a tube is directed toward the discharging outlet and gas is introduced into the container body through the tube by suction from the discharging outlet when a liquid pressure in the vicinity of the discharging outlet in the container body is lower than a liquid pressure outside the container body.

5. The fine bubble generating device of claim 4, wherein the tube and the axle are connected.

6. The fine bubble generating device of claim 1, wherein an inner wall of the container body has an annular cross-section in a direction of the discharging outlet, the first liquid fluid introducing inlet is provided so that the liquid fluid is introduced along a tangential direction of the annular shape from a cross-sectional view.

7. The fine bubble generating device of claim 1, wherein the container body comprises
- a preliminary swirl chamber where a first swirl flow flows, the first swirl flow being introduced from the first liquid fluid introducing inlet, a main swirl chamber where a second swirl flow flows, the second swirl flow being in the opposite direction from the first swirl flow flowing through the preliminary swirl chamber, and a second liquid fluid introducing inlet for introducing the liquid fluid from the preliminary swirl chamber to the main swirl chamber.

8. The fine bubble generating device of claim 7, wherein the main swirl chamber and the preliminary swirl chamber are formed by a reverse swirl flow generating wall, and the second liquid fluid introducing inlet is provided on the reverse swirl flow generating wall.

9. The fine bubble generating device of claim 1, wherein the axle of the discharged flow volume adjusting section is an axis extending along the axial direction approximately perpendicular to the end face of the discharging outlet and supported by the container body, the axis being inserted through the insertion bore of the baffle board so that the baffle board is movable in the axial direction through the insertion bore.

10. The fine bubble generating device of claim 9, wherein the axis has an end with a large outer diameter and an end with a small outer diameter and is formed to have an outer diameter that gradually increases from the small outer diameter end to the large outer diameter end.

11. The fine bubble generating device of claim 9, wherein the discharged flow volume adjusting section has a stopper plate provided so as to prevent the baffle board from being released from the axis.

12. The fine bubble generating device of claim 11, wherein the stopper plate comprises a washer through which the axis is inserted, and the washer restricts the movement of the baffle board from the discharging outlet to a direction of discharging the liquid fluid and acts as a buffering material.

13. The fine bubble generating device of claim 11, wherein the stopper plate restricts the movement of the baffle board at a position where an outer diameter of the axis is approximately identical to an inner diameter of the insertion bore of the baffle board.

* * * * *